United States Patent Office 2,818,877
Patented Jan. 7, 1958

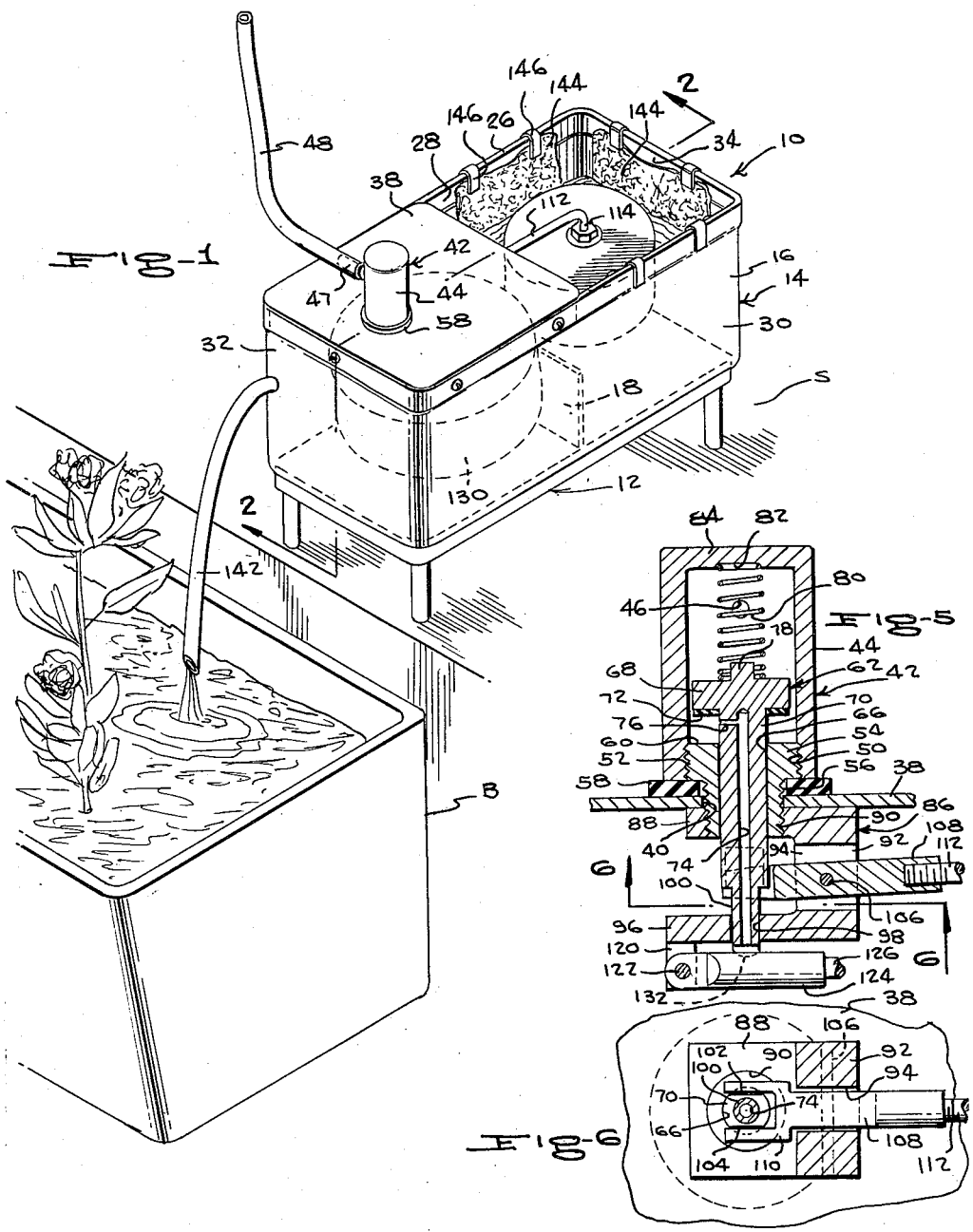

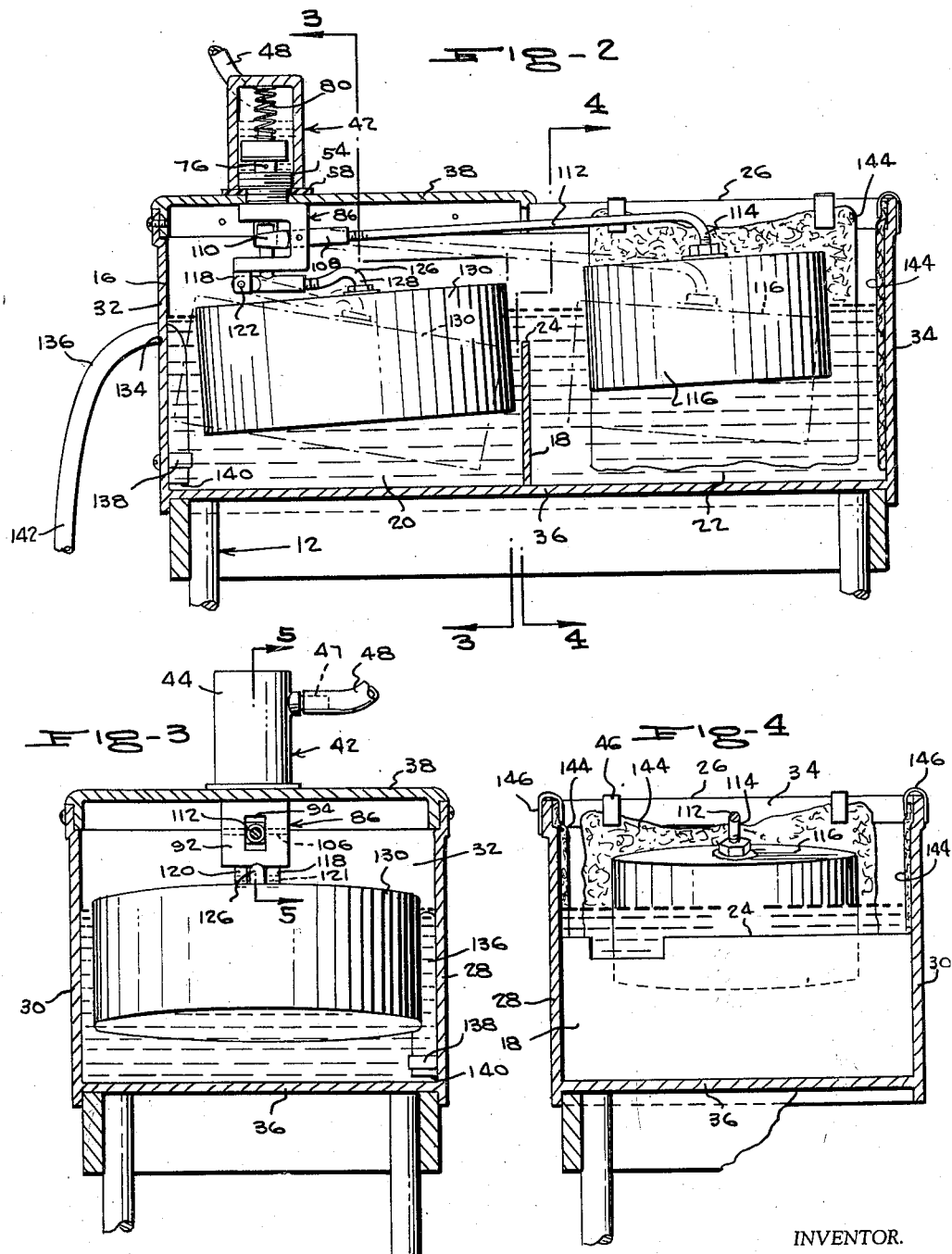

2,818,877
WATERING SYSTEM FOR PLANTS AND THE LIKE

Fritz O. Swanson, Astoria, N. Y.

Application March 29, 1957, Serial No. 649,523

6 Claims. (Cl. 137—135)

This invention relates generally to watering systems and is more particularly concerned with a novel watering system for plants and the like automatically activated in response to conditions substantially simulating normal evaporation from a plant or the like which has been watered.

A primary object of invention in conformance with that set forth is to provide in an automatic watering system of the character involved a fluid tank including a reservoir and control compartment, the compartments being periodically filled with a pressurized fluid through the medium of valve means in response to level-responsive control means operatively associated in said compartments with said valve means, the control compartment including means permitting a fluid contained therein to evaporate therefrom, and the reservoir compartment being operatively connected to siphon means wherein after a predetermined level of fluid has been attained in the reservoir compartment the same will be siphoned off to be dispensed to plants or the like.

A still further object of invention in conformance with that set forth is to provide in an automatic watering system of the character involved means whereby a predetermined quantity of water will be automatically dispensed in response to evaporation of a predetermined quantity of fluid contained within a control compartment.

And yet another object of invention in conformance with that set forth is to provide an automatic watering system of the character involved which is readily and economically manufactured, easily used and maintained, and highly efficient, satisfactory and acceptable for the purpose intended.

These together with other objects and advantages which will subsequently become apparent reside in the details of construction and operation as more fully hereinafter described and claimed, reference being had to the accompanying drawings forming a part hereof, wherein like numerals refer to like parts throughout, and which:

Figure 1 is a perspective view showing an exemplary embodiment of the novel automatic fluid watering system;

Figure 2 is a longitudinal vertical section taken substantially on the plane of line 2—2 of Figure 1, showing by means of phantom lines the operative positions of the level-responsive means of the watering system;

Figure 3 is a vertical section taken substantially on the plane of line 3—3 of Figure 2;

Figure 4 is a vertical section taken substantially on the plane of line 4—4 of Figure 2;

Figure 5 is an enlarged fragmentary section taken substantially on the plane of line 5—5 of Figure 3, showing the valve means of the invention in a "open" condition; and Figure 6 is a fragmentary section taken substantially on the plane of line 6—6 of Figure 5.

Referring to the drawing in detail, indicated generally at 10 is the novel apparatus utilized in the automatic watering system of the invention, said apparatus being supported on a suitable horizontal support member S by means of a suitable support frame indicated generally at 12 for the purpose of watering a flower pot or the like B which will be located below the support surface S.

The novel apparatus of the watering system is indicated generally at 14 including in the exemplary embodiment a rectangularly conformed open topped tank 16. The tank 16 and the parts to subsequently be described may be constructed of any suitable material, readily moldable plastics, for example, being conductive to mass production methods.

The tank 16 has extending transversely in suitably secured relationship between opposite sides thereof a partition panel 18 defining within the tank 16 a reservoir and control compartment indicated at 20 and 22 respectively. The panel 18 terminates at its upper edge 24 below the upper edge 26 of the tank 16, and accordingly when a fluid flows into the reservoir compartment 20 it will flow over the upper edge of the panel 18 and flow into the control compartment 22.

For the purpose of convenience, the side walls of the tank 16 will be identified at 28 and 30, being suitably secured to transverse end walls 32 and 34, the side, end walls and panel 18 being suitably secured to a transverse bottom wall 36. A suitable transverse cover member 38 is secured in overlying relationship relative to the reservoir compartment 20 in any suitable manner. The cover member 38 has extending transversely therethrough a transverse aperture 40, see Figure 5, facilitating the mounting of a vertically extending valve assembly indicated generally at 42.

The valve assembly 42 incorporates a hollow housing member 44 having a circular cross section, if desired, and incorporating transversely through one side thereof a bore portion 46 communicating with a laterally extending tubular stem 47 which will be operatively connected to a suitable tube 48 in communication with a source of pressure fluid (not shown). The housing member 44 incorporates a threaded portion on the inner periphery adjacent its open end as indicated at 50 for receiving therein the external threads 52 of a valve element 54. The valve element 54 incorporates a reduced diametered externally threaded portion 56 extendable through the transverse aperture 40 of the cover 38, and interposed between the lower edge of the housing member 44 and the upper surface of the cover member 38 in circumposed relationship about the externally threaded portion 56 is a suitable sealing washer element 58. The upper surface 60 of the valve element constitutes a valve seat for a vertically displaceable valve indicated generally at 62. The valve element 54 has extending transversely therethrough a centrally located bore portion 66. The valve 62 includes a sealing head 68 integral with a depending stem 70 which extends through the bore 66 of the valve element. Circumposed about the stem 70 beneath the under surface of the head 68 is a suitable annular sealing washer 72. The stem 70 incorporates longitudinally therethrough a downwardly opening bore portion 74 terminating in a communicating laterally extending port or bore 76 communicating with the interior of the housing 44, and accordingly the source of pressurized fluid when the valve 62 is disposed in the raised or "open" condition shown in Figure 5. The washer 72 seats on the valve seat 60 of the valve element, the bore 76 will be disposed within the bore 66 of the valve element, and accordingly pressurized fluid will not pass therethrough to be communicated with the reservoir compartment 20. The head 68 incorporates a vertically extending stub shaft portion 78 which has circumposed thereabout one end of a suitable compression or biasing spring 80, the other end of said spring being received within a suitable concentrically located downwardly opening recess 82 in the terminating ad-
wall 36 of the
as indicated at
relative to the
ll be discharged
and period-
escribed in de-
he bore of the
nal diameter of
ingly when the
ut of the reser-
enter therein.
the siphon tube
vel in the tank
nd accordingly
the siphon tube
erein to subse-
reservoir com-
end 140 of said artment 22 has
ntained therein
esulting in the
y the phantom
ionally, as the
ment 20 is low-
e phantom line rmal evaporat-
wer box B one
suitable char-
in juxtaposed
30 in the end
clip elements
tank 10. The
ereof disposed
mpartment 22,
erial conducive
ents 144 may
ily susceptible
after a relawing manner:
lve 62 toward
48 communi-
d fluid will act
rging the valve
e control com-
2 through the
he yoke on the
d by the under-
n 70 and urge
n in Figure 5.
ty at this time,
isposed in the
2. When the
n in Figure 5,
ort or bore 76
h the bore 74
As the level of
artment 20, it
f the panel 18
e level of the
eases the float
tion shown in
eratively con-
n the valve 62
e 62 will have
engaged with
float 130, and
be retained in
sure will con-
s substantially
he upper most
the fluid will automatically flow out of the siphon tube 136 and accordingly water the plants in the box B. As previously mentioned, the siphon tube 136 will remove the water more rapidly from the reservoir compartment 20 than it enters the same through the valve 62. Eventually, as the float 130 assumes the phantom line position shown in Figure 2, the spring 80 will bias the valve 62 to a "closed" condition, however, the float 116 will remain in the solid line position shown in Figure 2 inasmuch as the panel 18 will retain a predetermined level of fluid in the control compartment 22. As the fluid evaporates through the medium of the wick elements 144, the float 116 will eventually reach the phantom line position shown in Figure 2, wherein another cycle of operation will automatically take place in the apparatus in the manner just described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. In a watering system for periodically and automatically watering plants or the like comprising a tank including reservoir and control compartments and means for defining a first predetermined level of fluid therein below the full capacity of the tank, valve means communicating with the reservoir compartment for filling both compartments of the tank to a level above the first predetermined level from a source of pressurized fluid, siphon means communicating with the reservoir compartment for automatically emptying the reservoir compartment in response to a fluid level above the first predetermined level, means communicating with the control compartment assisting fluid contained therein to evaporate into the atmosphere, first level-responsive control means operatively connected to the valve means and disposed in the control compartment for opening the valve means and permitting fluid to enter the compartments when the fluid in the control compartment reaches a second predetermined level, and second level-responsive control means in the reservoir compartment operatively connected to said valve means for retaining said valve means open to obtain said first predetermined level in both compartments thereby activating the siphon means.

2. In a watering system as set forth in claim 1 wherein the means communicating with the control compartment assisting fluid to evaporate into the atmosphere comprises at least one control wick having a lower end thereof disposed in the control compartment for engagement with fluid contained therein.

3. In a watering system as set forth in claim 1 wherein said valve means comprises a vertically disposed housing overlying the reservoir compartment and including means for communicating with a source of pressurized fluid, a horizontal valve-seat element transversely apertured and extending transversely of the housing, a vertically displaceable valve including a longitudinally bored stem extending through the valve-seat element and including a lateral bore for communicating with the interior of the housing and dispensing fluid into the reservoir compartment when the valve stem is raised, and spring means in the housing operatively connected to the valve element biasing the same to a closed condition with the valve-seat element to prevent pressurized fluid from entering the tank.

4. In a watering system as set forth in claim 3 wherein said first and second level-responsive control means comprise float members in the reservoir and control compartments, each of said float members including a lever arm intermediately pivoted on a horizontal axis of rotation off-set from the stem of the valve element for vertical pivotal engagement therewith for overcoming the spring means and permitting the valve to open.

5. In a watering system as set forth in claim 4 wherein the lever arm of the float member in the control compartment is of a greater length than the other lever arm, said first mentioned lever arm being abuttingly engageable with an intermediate portion of the valve stem for raising the same in response to the level of fluid in the control compartment, the other lever arm intermediately engaging the terminal end of the valve stem for raising the same in response to the fluid level in the reservoir compartment.

6. In a watering system as set forth in claim 3 wherein the siphon includes means permitting a greater volume of water to be exhausted from the reservoir compartment than that entering therein through the valve means thereby permitting substantially all of the fluid contained in the reservoir compartment to be exhausted.

References Cited in the file of this patent

UNITED STATES PATENTS

| | | |
|---|---|---|
| 2,031,146 | Dodge | Feb. 18, 1936 |
| 2,445,717 | Richards | July 20, 1948 |
| 2,486,512 | Armstrong | Nov. 1, 1949 |